(12) United States Patent
Moision et al.

(10) Patent No.: US 11,909,452 B2
(45) Date of Patent: *Feb. 20, 2024

(54) OPTICAL AMPLIFIER BURST MODE COMMUNICATION WITH VARIABLE DUTY CYCLE

(71) Applicant: X DEVELOPMENT LLC, Mountain View, CA (US)

(72) Inventors: Bruce Moision, Pasadena, CA (US); Devin Brinkley, Redwood City, CA (US); Baris Ibrahim Erkmen, Sunnyvale, CA (US)

(73) Assignee: X Development LLC, Moutain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/112,081

(22) Filed: Feb. 21, 2023

(65) Prior Publication Data
US 2023/0208533 A1    Jun. 29, 2023

Related U.S. Application Data

(63) Continuation of application No. 17/487,138, filed on Sep. 28, 2021, now Pat. No. 11,611,398, which is a
(Continued)

(51) Int. Cl.
*H04B 10/80* (2013.01)
*H04B 10/291* (2013.01)
*H04B 10/564* (2013.01)

(52) U.S. Cl.
CPC ........... *H04B 10/80* (2013.01); *H04B 10/291* (2013.01); *H04B 10/564* (2013.01)

(58) Field of Classification Search
CPC .... H04B 10/80; H04B 10/564; H04B 10/291; H04B 10/1123
See application file for complete search history.

(56) References Cited

U.S. PATENT DOCUMENTS

| 6,643,466 B1* | 11/2003 | Helms | H04B 10/503 |
| | | | 398/115 |
| 10,153,849 B2* | 12/2018 | D'Errico | H04B 10/803 |

(Continued)

FOREIGN PATENT DOCUMENTS

| CN | 106788770 A | 5/2017 |
| JP | 2011239385 A | 11/2011 |

(Continued)

OTHER PUBLICATIONS

M. W. Wright,"A Fiber-Based Master Oscillator Power Amplifier Laser Transmitter for Optical Communications," Nov. 15, 2007, IPN Progress Report 42-171,tda.jpl.nasa.gov,pp. 1-14.*

(Continued)

*Primary Examiner* — Omar S Ismail
(74) *Attorney, Agent, or Firm* — Botos Churchill IP Law LLP

(57) ABSTRACT

An optical communication system includes an optical transmitter and one or more processors. The optical transmitter is configured to output an optical signal, and includes an average-power-limited optical amplifier, such as an erbium-doped fiber amplifier (EDFA). The one or more processors are configured to receive optical signal data related to a received power for a communication link from a remote communication system and determine that the optical signal data is likely to fall below a minimum received power within a time interval. In response to the determination, the one or more processors are configured to determine a duty cycle of the optical transmitter based on a minimum on-cycle length and a predicted EDFA output power and operate the optical transmitter using the determined duty cycle to transmit an on-cycle power that is no less than the minimum required receiver power for error-free operation of the communication link.

21 Claims, 5 Drawing Sheets

Related U.S. Application Data continuation of application No. 17/066,624, filed on Oct. 9, 2020, now Pat. No. 11,159,249, which is a continuation of application No. 16/529,337, filed on Aug. 1, 2019, now Pat. No. 10,841,015.

(60) Provisional application No. 62/793,144, filed on Jan. 16, 2019.

(56) References Cited

U.S. PATENT DOCUMENTS

| | | | | |
|---|---|---|---|---|
| 10,841,015 B2* | 11/2020 | Moision | | H04B 10/1123 |
| 2003/0219253 A1* | 11/2003 | Kukshya | | H04B 10/1121 |
| | | | | 398/118 |
| 2009/0168843 A1* | 7/2009 | Waters | | H04B 1/1615 |
| | | | | 327/544 |
| 2009/0279887 A1 | 11/2009 | Xia et al. | | |
| 2010/0067421 A1* | 3/2010 | Gorokhov | | H04W 52/0216 |
| | | | | 370/311 |
| 2011/0103432 A1* | 5/2011 | Tangudu | | H04B 1/70755 |
| | | | | 375/150 |
| 2012/0106978 A1 | 5/2012 | Jenson | | |
| 2012/0108928 A1* | 5/2012 | Tverskoy | | A61B 5/0059 |
| | | | | 600/324 |
| 2013/0182620 A1* | 7/2013 | Chaffee | | H04J 14/06 |
| | | | | 398/43 |
| 2014/0292269 A1* | 10/2014 | Keating | | H02J 50/12 |
| | | | | 320/108 |
| 2015/0349881 A1* | 12/2015 | Byers | | H04B 10/11 |
| | | | | 398/118 |
| 2018/0183516 A1 | 6/2018 | Moision et al. | | |
| 2020/0015171 A1 | 1/2020 | Nadakuduti et al. | | |
| 2020/0228209 A1* | 7/2020 | Moision | | H04B 10/564 |

FOREIGN PATENT DOCUMENTS

| | | |
|---|---|---|
| JP | 2015173508 A | 10/2015 |
| JP | 2016201679 A | 12/2016 |

OTHER PUBLICATIONS

Kiichi Niitsu,"CMOS Circuits to Measure Timing Jitter Using a Self-Referenced Clock and a Cascaded Time Difference Amplifier With Duty-Cycle Compensation," Oct. 26, 2012, IEEE Journal of Solid-State Circuits, vol. 47, No. 11, Nov. 2012,pp. 2701-2708.*

Michel E. Marhic,"Fiber optical parametric amplifiers in optical communication systems," Sep. 30, 2014,Laser Photonics Rev. 9, No. 1, 50-74 (2015),pp. 51-65.*

R. Kingsbury,"Implementation and validation of a CubeSat laser transmitter, "Mar. 15, 2016,Proc. of SPIE vol. 9739,pp. 2-7.*

Ghafour Amouzad Mahdiraji,"Improving the performance of electrical duty-cycle division multiplexing with optimum signal level spacing, "Dec. 17, 2011,Optics Communications 285 (2012),pp. 1819-1823.*

Chang Liu,"Investigation of High-Efficiency Parallel-Circuit Class-EF Power Amplifiers With Arbitrary Duty Cycles," Feb. 17, 2021, IEEE Transactions on Industrial Electronics, vol. 68, No. 6, Jun. 2021,pp. 5000-5009.*

Iskender Haydaroglu,"Optically Powered Optical Transmitter Using a Single Light-Emitting Diode," Jul. 26, 2017, IEEE Transactions on Circuits and Systems—I: Regular Papers, vol. 64, No. 8, Aug. 2017,pp. 2003-2008.*

Amin Malekmohammadi,"Realization of high capacity transmission in fiber optic communication systems using Absolute Polar Duty Cycle Division Multiplexing (AP-DCDM) technique," Apr. 19, 2009, Optical Fiber Technology 15 (2009),pp. 338-342.*

International Search Report and Written Opinion for Application No. PCT/US2020/013447 dated May 20, 2020.

Notice of Reasons for Rejection for Japanese Patent Application No. 2021-532305, dated Feb. 4, 2022.

Office Action for Japanese Patent Application No. 2022-116397, dated Oct. 10, 2023, 7 Pages.

* cited by examiner

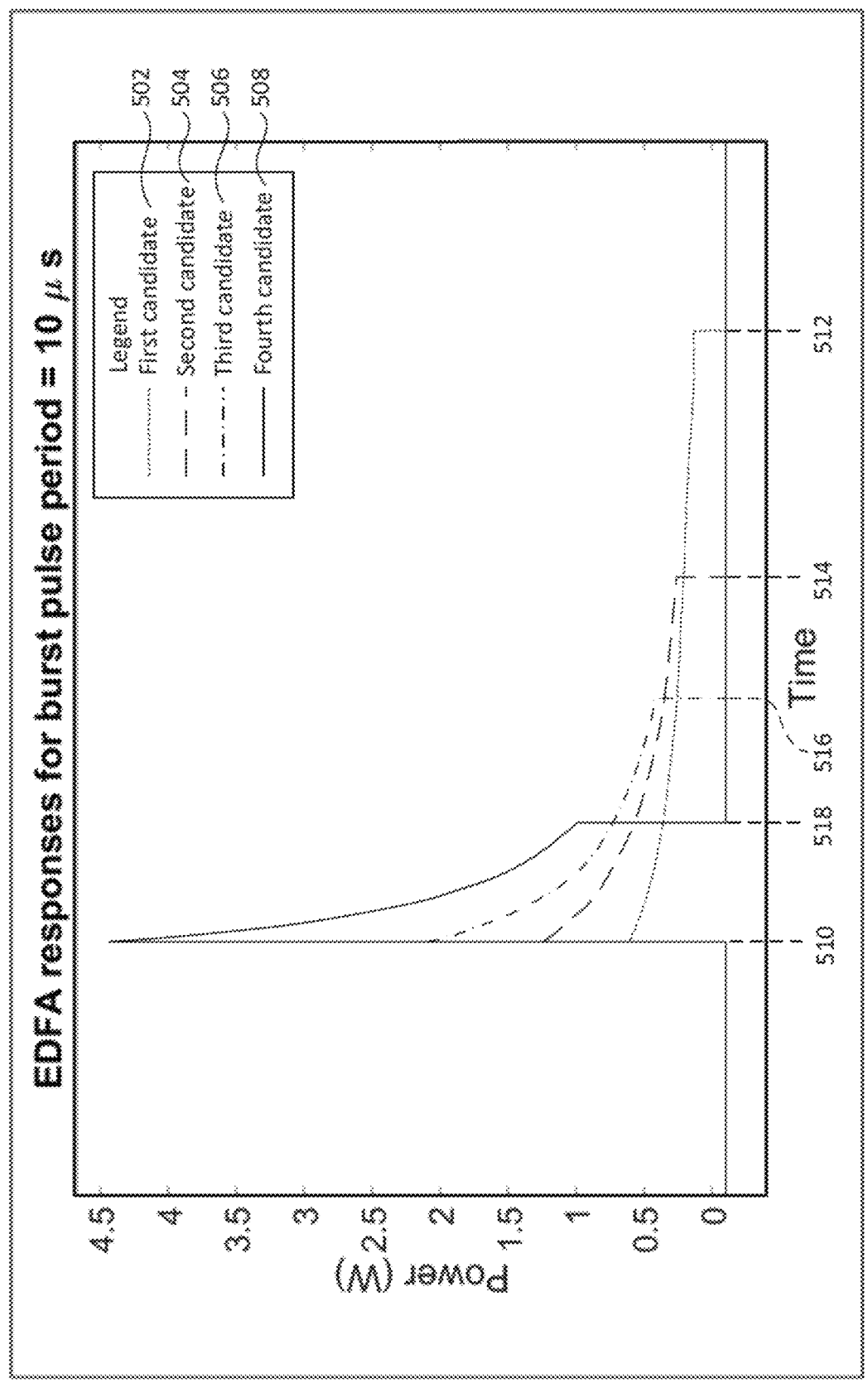

OPTICAL AMPLIFIER BURST MODE COMMUNICATION WITH VARIABLE DUTY CYCLE

CROSS REFERENCE TO RELATED APPLICATIONS

This application is a continuation of U.S. patent application Ser. No. 17/487,138, filed Sep. 28, 2021, which is a continuation of U.S. patent application Ser. No. 17/066,624, filed Oct. 9, 2020, now issued as U.S. Pat. No. 11,159,249, which is a continuation of U.S. patent application Ser. No. 16/529,337, filed Aug. 1, 2019, now issued as U.S. Pat. No. 10,841,015, which claims the benefit of the filing date of U.S. Provisional Patent Application No. 62/793,144 filed Jan. 16, 2019, the disclosures of which are hereby incorporated herein by reference.

BACKGROUND

Communication terminals may transmit and receive optical signals through free space optical communication (FSOC) links. In order to accomplish this, such terminals generally use acquisition and tracking systems to establish the optical link by pointing optical beams towards one another. For instance, a transmitting terminal may use a beacon laser to illuminate a receiving terminal, while the receiving terminal may use a position sensor to locate the transmitting terminal and to monitor the beacon laser. Steering mechanisms may maneuver the terminals to point toward each other and to track the pointing once acquisition is established. A high degree of pointing accuracy may be required to ensure that the optical signal will be correctly received.

BRIEF SUMMARY

Aspects of the disclosure provide for an optical communication system. The optical communication system includes an optical transmitter configured to output an optical signal, the optical transmitter including an erbium-doped fiber amplifier (EDFA); and one or more processors operatively coupled to the optical transmitter. The one or more processors are configured to receive optical signal data related to a received power for a communication link from a remote communication system; determine that the optical signal data is likely to fall below a minimum received power within a time interval; in response to the determination that the optical signal data is likely to fall below the minimum received power within the time interval, determine a duty cycle of the optical transmitter based on a minimum on-cycle length and a predicted EDFA output power; and operate the optical transmitter using the determined duty cycle to transmit the optical signal on the communication link.

In one example, the optical signal data includes a plurality of measurements for received power; and the one or more processors are configured to determine that the optical signal data is likely to fall below the minimum received power within the time interval based on an identified trend of the plurality of measurements over the time interval. In another example, the optical signal data includes a plurality of measurements for received power; and the one or more processors are configured to determine that the optical signal data is likely to fall below the minimum received power within the time interval based on an extrapolation of a trend of the plurality of measurements into the time interval. In a further example, the one or more processors are configured to determine the duty cycle based on a selected candidate duty cycle that has at least the minimum on-cycle length, a predicted EDFA output power for the selected candidate duty cycle, a determination that the predicted EDFA output power for the candidate duty cycle will satisfy the minimum received power, and a determination that the duty cycle has a same characteristic as the candidate duty cycle when the duty cycle will satisfy the minimum received power.

In yet another example, the one or more processors are configured to determine the duty cycle based on an accessible database of predicted EDFA output power for a plurality of duty cycles of the optical transmitter. In a still further example, the one or more processors are also configured to receive updated optical signal data related to the received power for the communication link; determine an updated duty cycle of the optical transmitter based on the minimum on-cycle length and the predicted EDFA output power; and operate the optical transmitter using the updated duty cycle. In another example, the one or more processors are also configured to receive updated optical signal data related to the received power for the communication link; determine that the received power will likely exceed a maximum received power in a second time interval; after determining the optical signal data will likely exceed the maximum received power within the second time interval, determine an updated duty cycle of the optical transmitter based on the minimum on-cycle length and the predicted EDFA output power; and operate the optical transmitter using the updated duty cycle. In a further example, the one or more processors are configured to operate the optical transmitter to achieve a higher data transmission rate during an overshoot of the predicted EDFA output power and a lower data transmission rate during a decay of the predicted EDFA output power.

Other aspects of the disclosure provide for a method of operating an optical transmitter over a communication link. The method includes receiving, by one or more processors, optical signal data related to a received power for a communication link from a remote communication system; determining, by the one or more processors, that the optical signal data is likely to fall below a minimum received power within a time interval; in response to the determination that the optical signal data is likely to fall below the minimum received power within the time interval, the one or more processors determine a duty cycle of the optical transmitter based on a minimum on-cycle length and a predicted EDFA output power; and operate, by the one or more processors, the optical transmitter using the determined duty cycle to transmit the optical signal on the communication link.

In one example, the optical signal data includes a plurality of measurements for received power; and determining that the optical signal is likely to fall below the minimum received power within the time interval includes identifying a trend of the plurality of measurements over the time interval. In another example, the optical signal data includes a plurality of measurements for received power. Also in this example, determining that the optical signal data is likely to fall below the minimum received power within the time interval includes identifying a trend of the plurality of measurements before the time interval; and extrapolating the trend into the time interval.

In a further example, determining the duty cycle includes selecting a candidate duty cycle that has at least the minimum on-cycle length, determining a predicted EDFA output power for the candidate duty cycle, determining whether the predicted EDFA output power for the candidate duty cycle will satisfy the minimum received power, and determining that the duty cycle has a same characteristic as the candidate duty cycle when the duty cycle will satisfy the minimum received power. In yet another example, determining the duty cycle includes accessing a database of predicted EDFA output power for a plurality of duty cycles of the optical transmitter.

In a still further example, the method also includes receiving, by the one or more processors, updated optical signal data related to the received power for the communication link; determining, by the one or more processors, an updated duty cycle of the optical transmitter based on the minimum on-cycle length and the predicted EDFA output power; and operating, by the one or more processors, the optical transmitter using the updated duty cycle. In another example, the method also includes receiving, by the one or more processors, updated optical signal data related to the received power for the communication link; determining, by the one or more processors, that the received power will likely exceed a maximum received power in a second time interval; after determining the optical signal data will likely exceed the maximum received power within the second time interval, the one or more processors determine an updated duty cycle of the optical transmitter based on the minimum on-cycle length and the predicted EDFA output power; and operating, by the one or more processors, the optical transmitter using the updated duty cycle.

Further aspects of the disclosure provide for a non-transitory, tangible computer-readable storage medium on which computer readable instructions of a program are stored. The instructions, when executed by one or more processors of a first communication device, cause the one or more processors to perform a method. The method includes receiving optical signal data related to a received power for a communication link from a second communication device; determining that the optical signal data is likely to fall below a minimum received power within a time interval; in response to the determination that the optical signal data is likely to fall below the minimum received power within the time interval, determining a duty cycle of an optical transmitter based on a minimum on-cycle length and a predicted EDFA output power; and operating the optical transmitter using the determined duty cycle to transmit the optical signal on the communication link.

In one example, the optical signal data includes a plurality of measurements for received power; and determining that the optical signal is likely to fall below the minimum received power within the time interval includes identifying a trend of the plurality of measurements over the time interval. In another example, the optical signal data includes a plurality of measurements for received power. Also in this example, determining that the optical signal data is likely to fall below the minimum received power within the time interval includes identifying a trend of the plurality of measurements before the time interval; and extrapolating the trend into the time interval.

In a further example, determining the duty cycle includes selecting a candidate duty cycle that has at least the minimum on-cycle length, determining a predicted EDFA output power for the candidate duty cycle, determining whether the predicted EDFA output power for the candidate duty cycle will satisfy the minimum received power, and determining that the duty cycle has a same characteristic as the candidate duty cycle when the duty cycle will satisfy the minimum received power. In a still further example, the method also includes receiving updated optical signal data related to the received power for the communication link; determining that the received power will likely exceed a maximum received power in a second time interval; after determining the optical signal data will likely exceed the maximum received power within the second time interval, determining an updated duty cycle of the optical transmitter based on the minimum on-cycle length and the predicted EDFA output power; and operating the optical transmitter using the updated duty cycle.

BRIEF DESCRIPTION OF THE DRAWINGS

FIG. 5 is a graph 500 depicting a behavior of a communication device in accordance with aspects of the disclosure.

DETAILED DESCRIPTION

Overview

The technology relates to a burst mode for optical communication using an optical amplifier, such as an erbium-doped fiber amplifier (EDFA) designed for average power limited performance, so as the amount of "power-on" time for EDFAs is reduced for a given input power, the peak output power of the EDFAs is increased. This feature of EDFAs may be utilized to maintain a communication link as the channel attenuation or turbulence increases. In other words, the average data rate of an on-off keying communication link may be decreased in order to increase the peak transmit power over the communication link in order to maintain the communication link during the peak power interval. Other optical amplification technologies, such as those with other rare-earth dopants or semiconductor optical amplifiers (SOAs) may be used instead of the EDFA.

The features described above may be employed to provide a communication link that maintains positive throughput even in heavy attenuation, and therefore is more consistently available than other configurations. The features take advantage of existing characteristics of the EDFA to increase and decrease peak output power as needed within the average optical power constraint for an optical communication link. The communication link may have higher availability and greater data throughput. The capability could additionally be utilized for transmitting high priority data, control traffic, or tracking information across the link.

Example Systems

Figure 1:
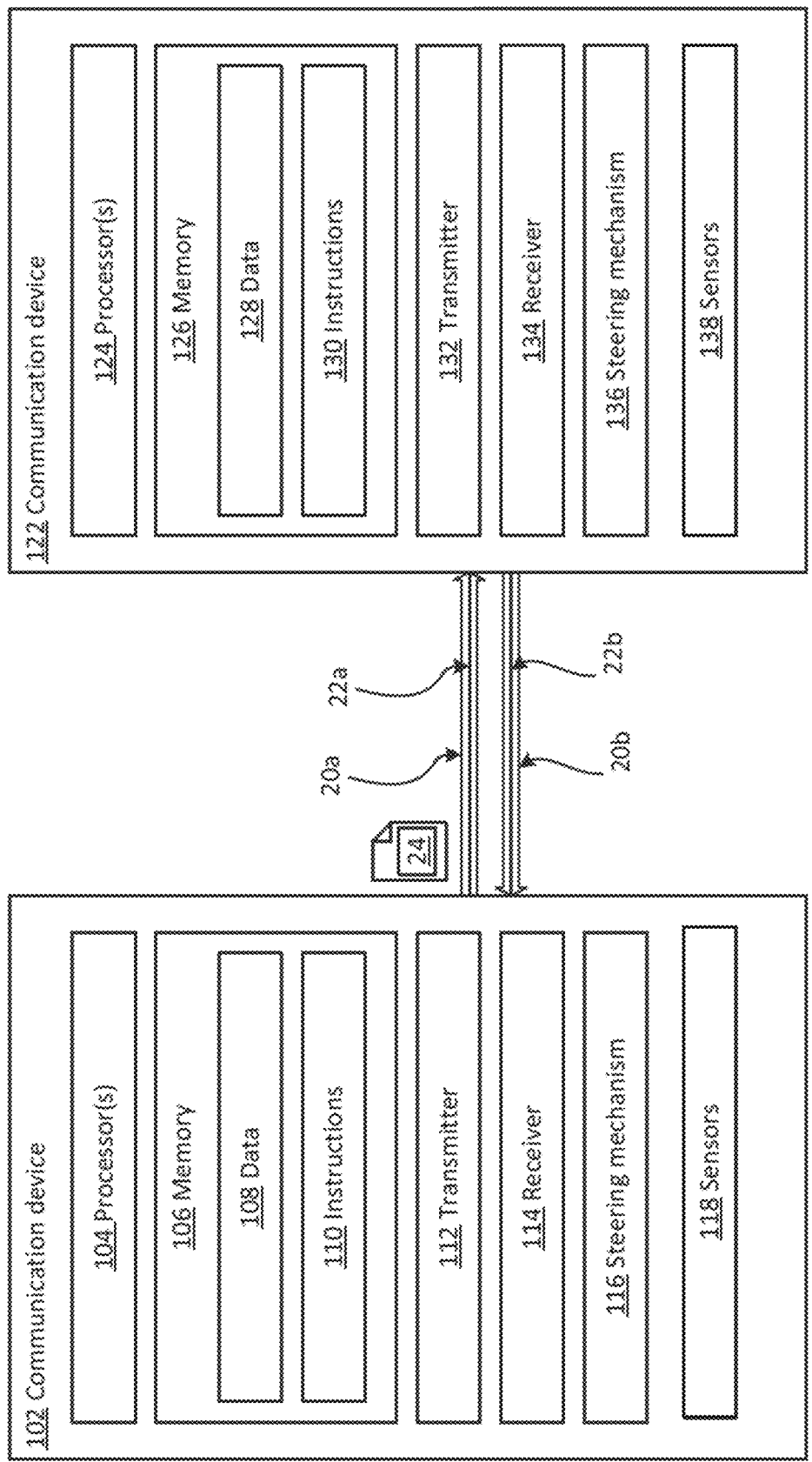
FIG. 1 is a block diagram 100 of a first communication device and a second communication device in accordance with aspects of the disclosure.

FIG. 1 is a block diagram 100 of a first communication device 102 of a first communication terminal configured to form one or more links with a second communication device 122 of a second communication terminal, for instance as part of a system such as a free-space optical communication (FSOC) system. For example, the first communication device 102 includes as components one or more processors 104, a memory 106, a transmitter 112, a receiver 114, a steering mechanism 116, and one or more sensors 118. The first communication device 102 may include other components not shown in FIG. 1.

The one or more processors 104 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 1 functionally illustrates the one or more processors 104 and memory 106 as being within the same block, the one or more processors 104 and memory 106 may actually comprise multiple processors and memories that may or may not be stored within the same physical housing. Accordingly, references to a processor or computer will be understood to include references to a collection of processors or computers or memories that may or may not operate in parallel.

Memory 106 may store information accessible by the one or more processors 104, including data 108, and instructions 110, that may be executed by the one or more processors 104. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 108 and instructions 110 are stored on different types of media. In the memory of each communication device, such as memory 106, calibration information may be stored, such as one or more offsets determined for tracking a signal.

Data 108 may be retrieved, stored or modified by the one or more processors 104 in accordance with the instructions 110. For instance, although the technology is not limited by any particular data structure, the data 108 may be stored in computer registers, in a relational database as a table having a plurality of different fields and records, XML documents or flat files.

The instructions 110 may be any set of instructions to be executed directly (such as machine code) or indirectly (such as scripts) by the one or more processors 104. For example, the instructions 110 may be stored as computer code on the computer-readable medium. In that regard, the terms "instructions" and "programs" may be used interchangeably herein. The instructions 110 may be stored in object code format for direct processing by the one or more processors 104, or in any other computer language including scripts or collections of independent source code modules that are interpreted on demand or compiled in advance. Functions, methods and routines of the instructions 110 are explained in more detail below.

The one or more processors 104 are in communication with the transmitter 112 and the receiver 114. Transmitter 112 and receiver 114 may be part of a transceiver arrangement in the first communication device 102. The one or more processors 104 may therefore be configured to transmit, via the transmitter 112, data in a signal, and also may be configured to receive, via the receiver 114, communications and data in a signal. The received signal may be processed by the one or more processors 104 to extract the communications and data.

Figure 2:
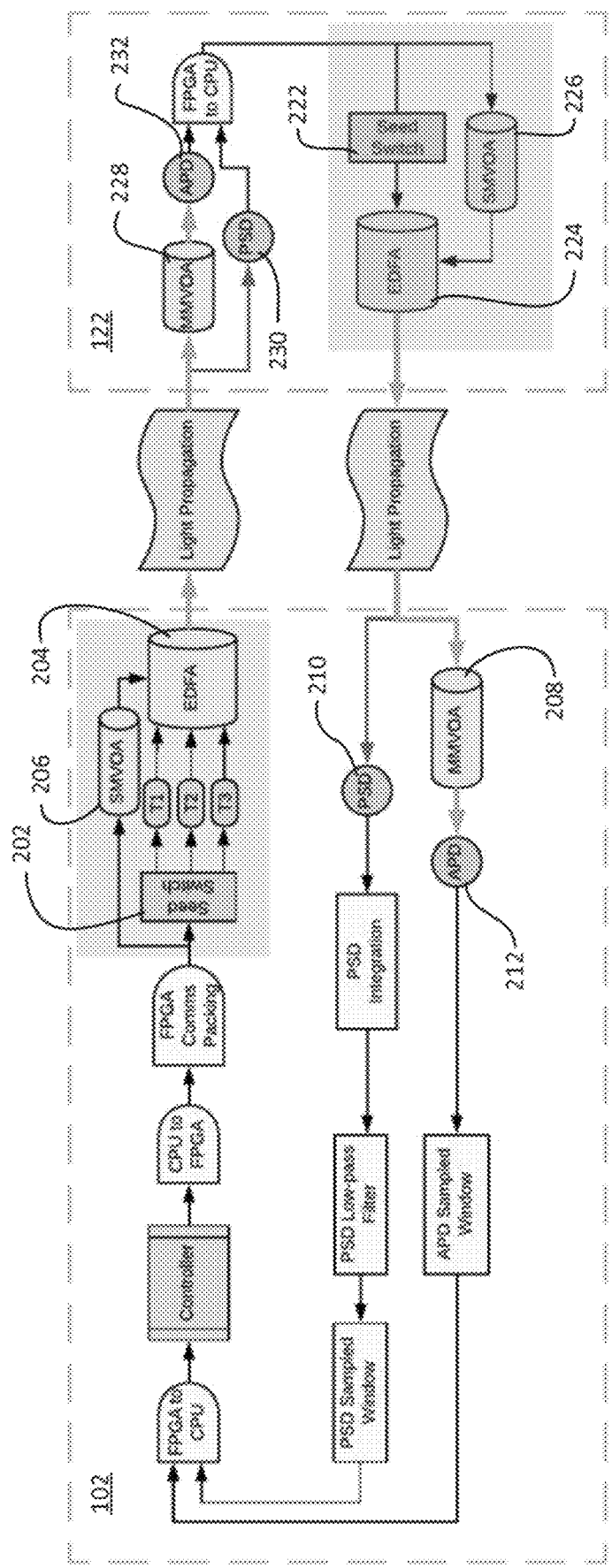
FIG. 2 is a pictorial diagram of components of the first communication device and the second communication device in accordance with aspects of the disclosure.

The transmitter 112 may include an optical transmitter, an amplifier, and an attenuator. As shown in FIG. 2, the transmitter 112 includes a seed laser 202 configured to provide an amount of bandwidth for an output signal, an EDFA 204 configured to increase an amplitude of the output signal, and a single mode variable optical attenuator (SMVOA) 206 configured to decrease the amplitude of the output signal. Other combinations of components than what is shown may be utilized for the transmitter 112. In addition, as shown in FIG. 1, the transmitter 112 may be configured to output a beacon beam 20 that allows one communication device to locate another, as well as a communication signal over a communication link 22. The output signal from the transmitter 112 may therefore include the beacon beam 20, the communication signal, or both. The communication signal may be a signal configured to travel through free space, such as, for example, a radio-frequency signal or optical signal. In some cases, the transmitter includes a separate beacon transmitter configured to transmit the beacon beam and one or more communication link transmitters configured to transmit the optical communication beam. Alternatively, the transmitter 112 may include one transmitter configured to output both the beacon beam and the communication signal. The beacon beam 20 may illuminate a larger solid angle in space than the optical communication beam used in the communication link 22, allowing a communication device that receives the beacon beam to better locate the beacon beam. For example, the beacon beam carrying a beacon signal may cover an angular area on the order of a square milliradian, and the optical communication beam carrying a communication signal may cover an angular area on the order of a hundredth of a square milliradian.

As shown in FIG. 1, the transmitter 112 of the first communication device 102 is configured to output a beacon beam 20a to establish a communication link 22a with the second communication device 122, which receives the beacon beam 20a. The first communication device 102 may align the beacon beam 20a co-linearly with the optical communication beam (not shown) that has a narrower solid angle than the beacon beam 20a and carries a communication signal 24. As such, when the second communication device 122 receives the beacon beam 20a, the second communication device 122 may establish a line-of-sight link with the first communication device 102 or otherwise align with the first communication device. As a result, the communication link 22a that allows for the transmission of the optical communication beam (not shown) from the first communication device 102 to the second communication device 122 may be established.

The receiver 114 includes a tracking system configured to detect an optical signal. As shown in FIG. 2, the receiver 114 for the optical communication system may include a multimode variable optical attenuator 208 configured to adjust an amplitude of a received signal, a photosensitive detector 210, and/or a photodiode 212. Other combinations of components than what is shown may be utilized for the receiver 114. Using the photosensitive detector 210, the receiver 114 is able to detect a signal location and convert the received optical signal into an electric signal using the photoelectric effect. The receiver 114 is able to track the received optical signal, which may be used to direct the steering mechanism 116 to counteract disturbances due to scintillation and/or platform motion.

Returning to FIG. 1, the one or more processors 104 are in communication with the steering mechanism 116 for adjusting the pointing direction of the transmitter 112, receiver 114, and/or optical signal. The steering mechanism 116 may include one or more mirrors that steer an optical signal through the fixed lenses and/or a gimbal configured to move the transmitter 112 and/or the receiver 114 with respect to the communication device. In particular, the steering mechanism 116 may be a MEMS 2-axis mirror, 2-axis voice coil mirror, or piezo electronic 2-axis mirror. The steering mechanism 116 may be configured to steer the transmitter, receiver, and/or optical signal in at least two degrees of freedom, such as, for example, yaw and pitch. The adjustments to the pointing direction may be made to acquire a communication link, such as communication link 22, between the first communication device 102 and the second communication device 122. To perform a search for a communication link, the one or more processors 104 may be configured use the steering mechanism 116 to point the transmitter 112 and/or the receiver 114 in a series of varying directions until a communication link is acquired. In addition, the adjustments may optimize transmission of light from the transmitter 112 and/or reception of light at the receiver 114.

The one or more processors 104 are also in communication with the one or more sensors 118. The one or more sensors 118, or estimators, may be configured to monitor a state of the first communication device 102. The one or more sensors may include an inertial measurement unit (IMU), encoders, accelerometers, or gyroscopes and may include one or more sensors configured to measure one or more of pose, angle, velocity, torques, as well as other forces. In addition, the one or more sensors 118 may include one or more sensors configured to measure one or more environmental conditions such as, for example, temperature, wind, radiation, precipitation, humidity, etc. In this regard, the one or more sensors 118 may include thermometers, barometers, hygrometers, etc. While the one or more sensors 118 are depicted in FIG. 1 as being in the same block as the other components of the first communication device 102, in some implementations, some or all of the one or more sensors may be separate and remote from the first communication device 102.

The second communication device 122 includes one or more processors 124, a memory 126, a transmitter 132, a receiver 134, a steering mechanism 136, and one or more sensors 138. The one or more processors 124 may be similar to the one or more processors 104 described above. Memory 126 may store information accessible by the one or more processors 124, including data 128 and instructions 130 that may be executed by processor 124. Memory 126, data 128, and instructions 130 may be configured similarly to memory 106, data 108, and instructions 110 described above. In addition, the transmitter 132, the receiver 134, and the steering mechanism 136 of the second communication device 122 may be similar to the transmitter 112, the receiver 114, and the steering mechanism 116 described above.

Like the transmitter 112, transmitter 132 may include an optical transmitter, an amplifier, and an attenuator. As shown in FIG. 2, the transmitter 132 includes a seed laser 222 configured to provide an amount of bandwidth for an output signal, an EDFA 224 configured to increase an amplitude of the output signal, and a SMVOA 226 configured to decrease the amplitude of the output signal. Other combinations of components than what is shown may be utilized for the transmitter 132. Additionally, as shown in FIG. 1, transmitter 132 may be configured to output both an optical communication beam and a beacon beam. For example, transmitter 132 of the second communication device 122 may output a beacon beam 20b to establish a communication link 22b with the first communication device 102, which receives the beacon beam 20b. The second communication device 122 may align the beacon beam 20b co-linearly with the optical communication beam (not shown) that has a narrower solid angle than the beacon beam and carries another communication signal. As such, when the first communication device 102 receives the beacon beam 20a, the first communication device 102 may establish a line-of-sight with the second communication device 122 or otherwise align with the second communication device. As a result, the communication link 22b, that allows for the transmission of the optical communication beam (not shown) from the second communication device 122 to the first communication device 102, may be established.

Like the receiver 114, the receiver 134 includes a tracking system configured to detect an optical signal as described above with respect to receiver 114. As shown in FIG. 2, the receiver 114 for the optical communication system may include a multi-mode variable optical attenuator 228 configured to adjust an amplitude of a received signal, a photosensitive detector 230, and/or a photodiode 232. Other combinations of components than what is shown may be utilized for the receiver 134. Other components similar to those pictured in the first communication device 102 may also be included in the second communication device 122. Using the photosensitive detector 230, the receiver 134 is able to detect a signal location and convert the received optical signal into an electric signal using the photoelectric effect. The receiver 134 is able to track the received optical signal, which may be used to direct the steering mechanism 136 to counteract disturbances due to scintillation and/or platform motion.

Returning to FIG. 1, the one or more processors 124 are in communication with the steering mechanism 136 for adjusting the pointing direction of the transmitter 132, receiver 134, and/or optical signal, as described above with respect to the steering mechanism 116. The adjustments to the pointing direction may be made to establish acquisition and connection link, such as communication link 22, between the first communication device 102 and the second communication device 122. In addition, the one or more processors 124 are in communication with the one or more sensors 138 as described above with respect to the one or more sensors 118. The one or more sensors 138 may be configured to monitor a state of the second communication device 122 in a same or similar manner that the one or more sensors 118 are configured to monitor the state of the first communication device 102.

As shown in FIG. 1, the communication links 22a and 22b may be formed between the first communication device 102 and the second communication device 122 when the transmitters and receivers of the first and second communication devices are aligned, or in a linked pointing direction. Using the communication link 22a, the one or more processors 104 can send communication signals to the second communication device 122. Using the communication link 22b, the one or more processors 124 can send communication signals to the first communication device 102. In some examples, it is sufficient to establish one communication link 22 between the first and second communication devices 102, 122, which allows for the bi-directional transmission of data between the two devices. The communication links 22 in these examples are FSOC links. In other implementations, one or more of the communication links 22 may be radio-frequency communication links or other type of communication link capable of travelling through free space.

Figure 3:
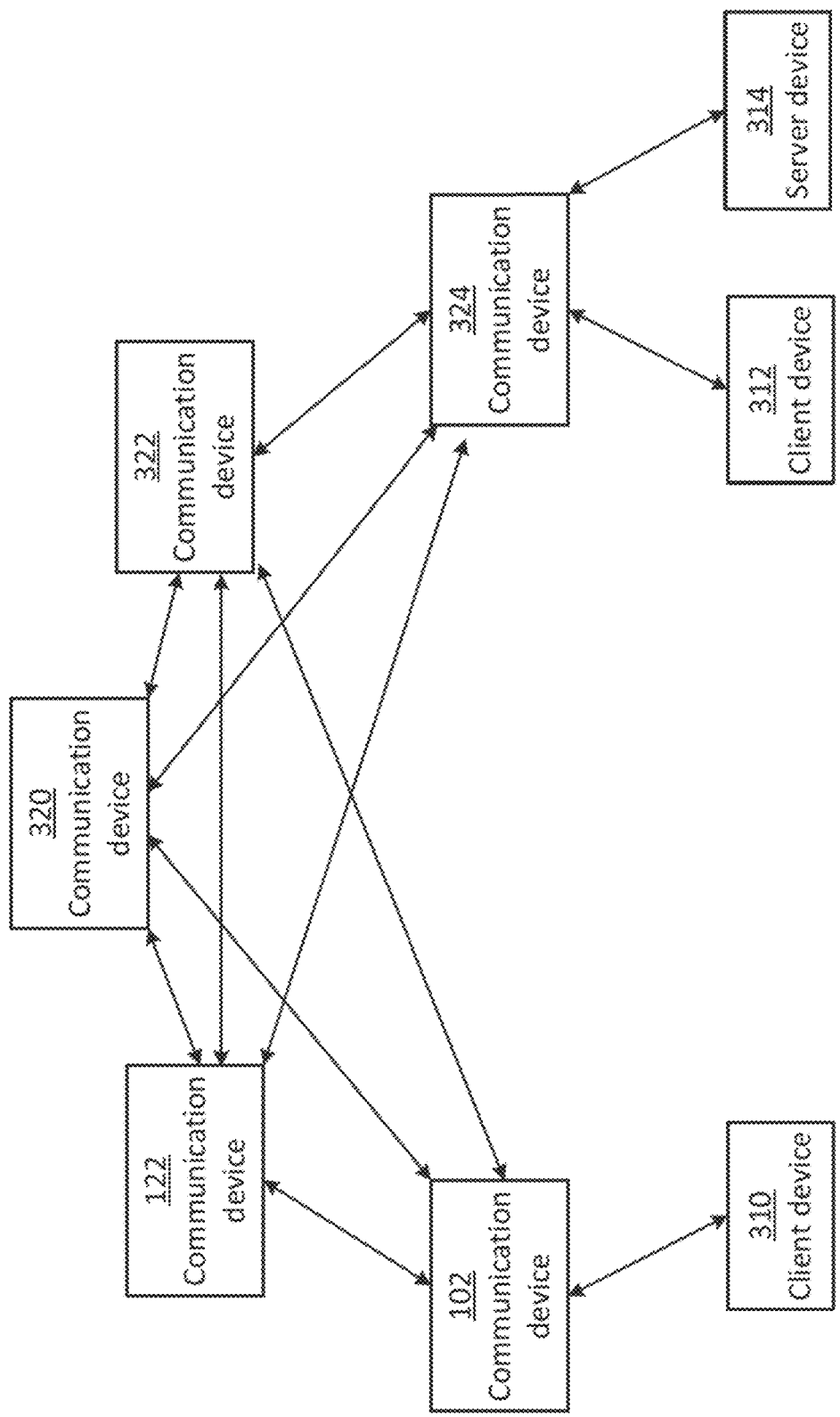
FIG. 3 is a pictorial diagram of a network 300 in accordance with aspects of the disclosure.

As shown in FIG. 3, a plurality of communication devices, such as the first communication device 102 and the second communication device 122, may be configured to form a plurality of communication links (illustrated as arrows) between a plurality of communication terminals, thereby forming a network 300. The network 300 may include client devices 310 and 312, server device 314, and communication devices 102, 122, 320, 322, and 324. Each of the client devices 310, 312, server device 314, and communication devices 320, 322, and 324 may include one or more processors, a memory, a transmitter, a receiver, and a steering mechanism similar to those described above.

Using the transmitter and the receiver, each communication device in network 300 may form at least one communication link with another communication device, as shown by the arrows. The communication links may be for optical frequencies, radio frequencies, other frequencies, or a combination of different frequency bands. In FIG. 3, the communication device 102 is shown having communication links with client device 310 and communication devices 122, 320, and 322. The communication device 122 is shown having communication links with communication devices 102, 320, 322, and 324.

The network 300 as shown in FIG. 3 is illustrative only, and in some implementations the network 300 may include additional or different communication terminals. The network 300 may be a terrestrial network where the plurality of communication devices is on a plurality of ground communication terminals. In other implementations, the network 300 may include one or more high-altitude platforms (HAPs), which may be balloons, blimps or other dirigibles, airplanes, unmanned aerial vehicles (UAVs), satellites, or any other form of high altitude platform, or other types of moveable or stationary communication terminals. In some implementations, the network 300 may serve as an access network for client devices such as cellular phones, laptop computers, desktop computers, wearable devices, or tablet computers. The network 300 also may be connected to a larger network, such as the Internet, and may be configured to provide a client device with access to resources stored on or provided through the larger computer network.

Example Methods

Figure 4:
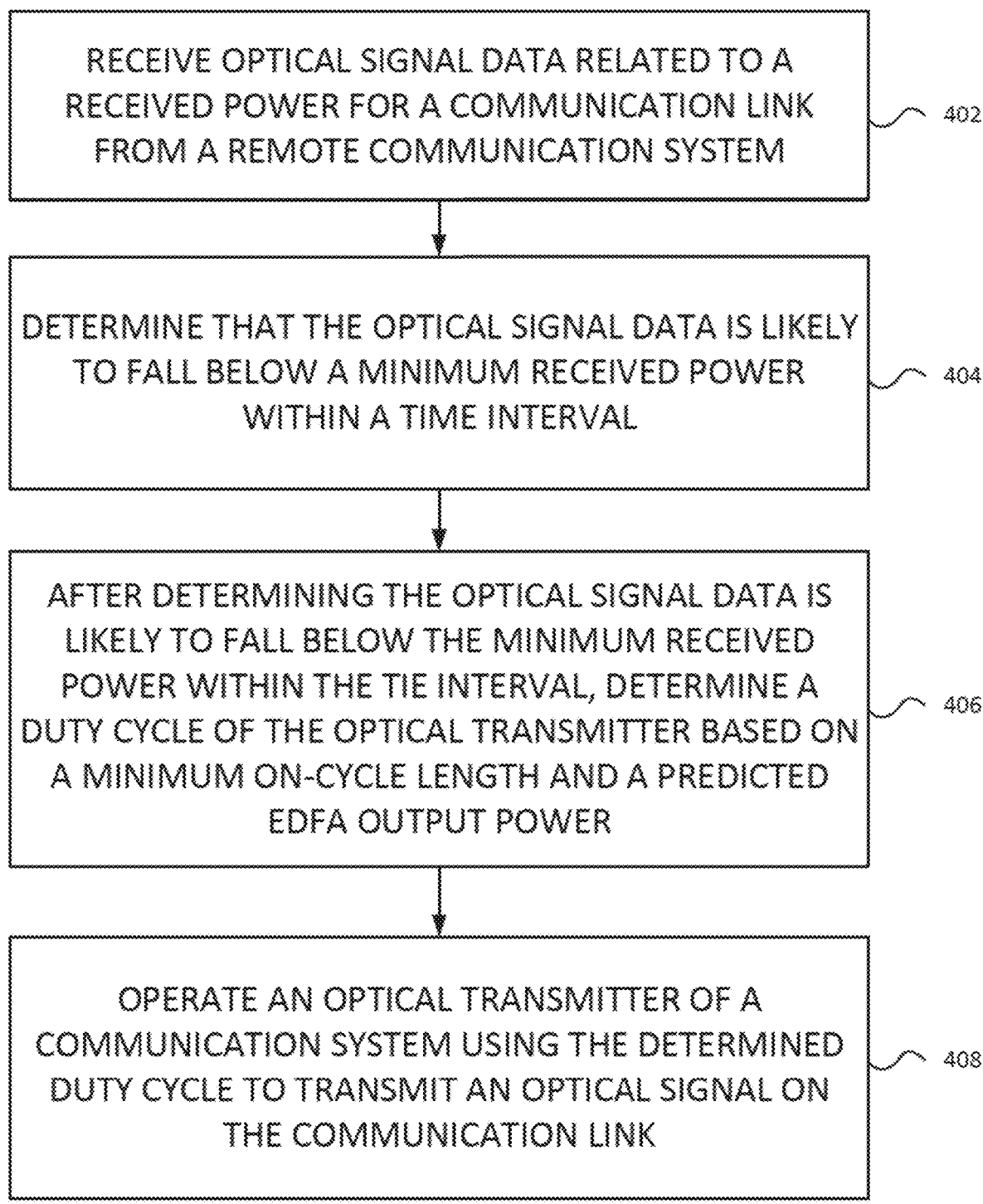
FIG. 4 is a flow diagram 400 depicting a method in accordance with aspects of the disclosure.

While connected, the one or more processors 104 of the first communication device 102 may adjust a transmitted optical signal for a communication link 22 with a second communication device 122 as described below. In some implementations, the one or more processors 124 of the second communication device 122 may also be configured to adjust the transmitted optical signal in a same or similar manner independently from the one or more processors 104. In FIG. 4, flow diagram 400 is shown in accordance with aspects of the disclosure that may be performed by the one or more processors 104 and/or the one or more processors 124. While FIG. 4 shows blocks in a particular order, the order may be varied and that multiple operations may be performed simultaneously. Also, operations may be added or omitted.

At block 402, the one or more processors 104 of the first communication device receive optical signal data related to received power for the communication link 22 from the second communication device 122. The signal data may include a relative received signal strength indicator (RSSI), bit error rate, codeword error rate, frame error rate, or other type of measurement that is correlated to channel conditions. In some implementations, the one or more processors 104 may derive data from the received optical signal data, such as the RSSI. The signal data may be received via an optical signal, a RF signal, etc. from the second communication device. The indication may be received continually or at regular intervals, such as every 0.1 seconds or more or less. The signal data may be stored in the memory 106 of the first communication device.

At block 404, the one or more processors 104 determine whether the optical signal data is likely to fall below a minimum received power within a time interval. The minimum received power may be an amount for which a communication link is required, such as an amount of power required for the receiver 134 of the second communication device 122 or an amount of power present in the environment of the first communication device 102 and the second communication device 122. The one or more processors 104 may track the received power over a set time interval, such as 1 millisecond, 1 second, 5 minutes, 1 hour, or more or less, to identify a trend of the received power over the set time interval. The trend may be, for example, an average change over the set time frame. The trend may be extrapolated over a next time interval to predict whether the received power will fall below a minimum received power threshold in the next time interval.

At block 406, when it is determined that the optical signal data is likely to fall below the minimum received power within the set time interval, the one or more processors 104 are configured to determine a duty cycle of the transmitter 112 of the first communication device 102 based on a minimum on-cycle length and a predicted EDFA output power. A burst cycle of the duty cycle may be defined as a period of time during which the transmitter 112 of the first communication device 102 turns on and off once. In other words, the burst cycle includes one on-cycle and one off-cycle. The on-cycle may be defined as the percentage of the burst cycle during which the transmitter 112 is transmitting an optical signal. Similarly, the off-cycle may be defined as the percentage of the burst cycle during which the transmitter 112 is off and is not transmitting a signal. To be determined as the duty cycle of the transmitter 112, a candidate duty cycle may be required to satisfy the minimum on-cycle length and one or more requirements for the predicted EDFA output power.

Determining the duty cycle includes selecting a candidate duty cycle that has at least the minimum on-cycle length. The minimum on-cycle length may be predetermined according to an average amount of time required for the receiver 134 of the second communication device 122 to acquire a signal and synchronize a clock of the remote optical communication system. For example, the average amount of time may be hundreds of microseconds or more or less. Additionally or alternatively, the minimum on-cycle length can be predetermined according to a minimum packet size required for the signal or a minimum number of bits for each on-cycle.

Determining the duty cycle further includes determining a predicted EDFA output power for the candidate duty cycle. The predicted EDFA output power may be determined using an algorithm that accounts for known behaviors of the EDFA, using machine learning, or using a database of predicted EDFA output power for a plurality of duty cycles.

For an algorithm, known behaviors of the EDFA include (i) that the EDFA is average power limited and therefore causes the output power to increase as the on-cycle length decreases, (ii) an initial overshoot in output power, (iii) a decay of output power during the on-cycle, and (iv) a noise level. FIG. 5 depicts examples of predicted EDFA output power for a first candidate duty cycle 502, a second candidate duty cycle 504, a third candidate duty cycle 506, and a fourth candidate duty cycle 508. Each candidate duty cycle is for an input signal having a same frequency and a same input power. The first candidate duty cycle 502 has a period of 10 microseconds and a 40% on-cycle; the second candidate duty cycle 504 has a period of 10 microseconds and 30% on-cycle; the third candidate 506 duty cycle has a period of 10 microseconds and a 20% on-cycle; and the fourth candidate duty cycle 508 has a period of 10 microseconds and a 10% on-cycle. As shown in FIG. 5, the average amplitude of the output power increases as the on-cycle length decreases, being approximately 0.3 W for the first candidate 502, approximately 0.5 W for the second candidate 504, approximately 1 W for the third candidate 506, and approximately 1.8 W for the fourth candidate 508. Also for each candidate in FIG. 5, there is an initial overshoot of power followed by a gradual decay, as shown by the peak at the start time 510 of each on-cycle and the gradual, negative slope of the graph from the start time 510 to respective end times 512, 514, 516, and 518. High frequency noise, such as power fluctuations from amplified spontaneous emissions, may also be included in the predicted EDFA output power.

The one or more requirements for the predicted EDFA output power that the candidate duty cycle is required to satisfy may include the minimum received power and/or the maximum received error rate. Determining the duty cycle then includes determining whether the predicted EDFA output power for the candidate duty cycle will satisfy the minimum received power and/or maximum error rate. The one or more processors may determine a difference value between an extrapolated received power at an end of the next time interval and the minimum received power. In another implementation, the one or more processors may determine a difference value between an extrapolated error rate at an end of the next time interval and the maximum error rate. When the predicted EDFA output power increases an output power by at least the difference value, the one or more processors 104 may determine that the predicted EDFA output power will satisfy the minimum received power.

In some examples, the one or more requirements for the predicted EDFA output power that the candidate duty cycle is required to satisfy may include a maximum initial overshoot in output power. Determining the duty cycle in this example includes determining that the predicted EDFA output power for the candidate duty cycle does not exceed a maximum initial overshoot in output power. The maximum initial overshoot may be determined based on a range of acceptable power levels for the receiver 134 of the second communication device 122 or an amount that may be damaging to the receiver 134. A minimum on-cycle percentage of the duty cycle may be determined based on the maximum initial overshoot. In this example, when the candidate duty cycle will also satisfy the maximum initial overshoot in addition to the other requirements discussed above, the duty cycle is determined to have the characteristics of the candidate duty cycle.

The one or more requirements may optionally also include maximizing data throughput. Determining the duty cycle in this example includes determining that the candidate duty cycle maximizes data throughput. This determination of maximum data throughput may be based on utilization data of the communication link 22, operational information of the communication link 22, channel capacity (number of error free non-redundant bits) of the communication link 22, or other features of the communication link 22.

At block 408, the one or more processors 104 are configured to operate the transmitter 112 using the determined duty cycle. Operating the transmitter 112 includes turning on the seed laser on during the on-cycle period and off during the off-cycle period. In addition, operating the transmitter may also include adjusting data transmission rate based on the predicted output power of the EDFA, including the predicted initial overshoot and the predicted decay rate. The data transmission rate may start at a higher rate during the predicted initial overshoot, and then decay proportional to the decay rate of the output power.

The process of adjusting the transmitted optical signal, including blocks 402, 404, 406, and 408, may be repeated continuously or at intervals. The intervals may be, for example, in the millisecond timescale. Alternatively, the one or more processors 124 of the second communication device 122 may perform the steps shown in blocks 402, 404, 406, and 408 according to optical signal data related to received power received from the first communication device 102 or another remote communication device.

In an alternative implementation, determining the duty cycle includes decreasing the on-cycle of the optical transmitter by an incremental step, such as 10%. This determined duty cycle may be implemented using the optical transmitter and an updated received power may be received. When the updated received power is below the minimum received power, the duty cycle may be reduced by the incremental step again. When the updated received power is equal to or above the minimum received power, no further change is made.

The method may additionally include determining that the received power will likely exceed a maximum received power in a second time interval by identifying a positive trend for the received power and increasing the duty cycle in order to decrease received power. The maximum received power may be a range of acceptable power levels for the receiver 134 of the second communication device 122 or an amount that may be damaging to the receiver 134.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An optical communication device including:
    an optical transmitter configured to output an optical signal, the optical transmitter including an amplifier; and
    one or more processors operatively coupled to the optical transmitter, the one or more processors being configured to:
        receive optical signal data related to a received power for a communication link from a remote communication system;
        determine a duty cycle of the optical transmitter based on at least two of: information about the received power for the communication link, a transmission cycle length, or output power information associated with the amplifier; and
        operate the optical transmitter using the determined duty cycle to transmit the optical signal on the communication link.

2. The optical communication device of claim 1, wherein the amplifier of the optical transmitter comprises an erbium-doped fiber amplifier (EDFA).

3. The optical communication device of claim 1, wherein the one or more processors are configured to determine the duty cycle based on one or more of:

a candidate duty cycle that has at least the minimum on-cycle length;
a predicted output power for the candidate duty cycle;
a determination that the predicted output power for the candidate duty cycle will satisfy a maximum received power threshold; and
a determination that the duty cycle has a same characteristic as the candidate duty cycle when the duty cycle will satisfy the maximum received power.

4. The optical communication device of claim 3, wherein the one or more processors are further configured to:
receive updated optical signal data related to the received power for the communication link;
determine an updated duty cycle of the optical transmitter based on the minimum on-cycle length and the predicted output power; and
operate the optical transmitter using the updated duty cycle.

5. The optical communication device of claim 1, wherein the one or more processors are configured to operate the optical transmitter to achieve a higher data transmission rate during an overshoot of predicted output power and a lower data transmission rate during a decay of the predicted output power.

6. The optical communication device of claim 1, wherein the one or more processors are further configured to:
determine that the received power is likely to fall below a minimum received power within a time interval; and
in response to the determination that the received power is likely to fall below the minimum received power within the time interval, the one or more processors are further configured to determine the duty cycle of the optical transmitter based on a minimum on-cycle length and a predicted output power of the optical transmitter.

7. The optical communication device of claim 1, wherein the one or more processors are configured to determine the duty cycle based on:
a selected candidate duty cycle that has at least a minimum on-cycle length; and
a determination that a predicted output power for the candidate duty cycle satisfies a minimum received power.

8. The optical communication device of claim 1, wherein the one or more processors are configured to determine the duty cycle based on a determination that a predicted output power for a candidate duty cycle satisfies a maximum initial overshoot.

9. The optical communication device of claim 1, wherein the one or more processors are further configured to:
determine that the received power is likely to exceed a maximum received power level within a time interval; and
wherein the duty cycle is determined after the determination that the received power is likely to exceed the maximum received power level within the time interval.

10. The optical communication device of claim 9, wherein:
the received optical signal data includes a plurality of measurements for received power; and
the one or more processors are configured to determine that the received power is likely to exceed the maximum received power level within the time interval based on an identified trend of the plurality of measurements over the time interval.

11. The optical communication device of claim 9, wherein:
the received optical signal data includes a plurality of measurements for received power; and
the one or more processors are configured to determine that the received power is likely to exceed the maximum received power level within the time interval based on an extrapolation of a trend of the plurality of measurements into the time interval.

12. A method of operating an optical transmitter over a communication link, the method comprising:
receiving, by one or more processors, optical signal data related to a received power for the communication link from a remote communication system;
determining, by the one or more processors, a duty cycle of the optical transmitter based on at least two of: information about the received power for the communication link, a transmission cycle length, or output power information associated with an amplifier of the optical transmitter; and
operating, by the one or more processors, the optical transmitter using the determined duty cycle to transmit the optical signal on the communication link.

13. The method of claim 12, wherein the duty cycle is determined based on one or more of:
a candidate duty cycle that has at least the minimum on-cycle length;
a predicted output power for the candidate duty cycle;
a determination that the predicted output power for the candidate duty cycle will satisfy a maximum received power threshold; and
a determination that the duty cycle has a same characteristic as the candidate duty cycle when the duty cycle will satisfy the maximum received power.

14. The method of claim 13, further comprising:
receiving, by the one or more processors, updated optical signal data related to the received power for the communication link;
determining, by the one or more processors, an updated duty cycle of the optical transmitter based on the minimum on-cycle length and the predicted output power; and
operating, by the one or more processors, the optical transmitter using the updated duty cycle.

15. The method of claim 12, wherein operating the optical transmitter achieves a higher data transmission rate during an overshoot of predicted output power and a lower data transmission rate during a decay of the predicted output power.

16. The method of claim 12, further comprising:
determining, by the one or more processors, that the received power is likely to fall below a minimum received power within a time interval; and
in response to determining that the received power is likely to fall below the minimum received power within the time interval, the duty cycle of the optical transmitter is determining based on a minimum on-cycle length and a predicted output power of the optical transmitter.

17. The method of claim 12, wherein determining the duty cycle is based on:
a selected candidate duty cycle that has at least a minimum on-cycle length; and
a determination that a predicted output power for the candidate duty cycle satisfies a minimum received power.

18. The method of claim 12, wherein determining the duty cycle is based on a determination that a predicted output power for a candidate duty cycle satisfies a maximum initial overshoot.

19. The method of claim 12, further comprising:
determining, by the one or more processors, that the received power is likely to exceed a maximum received power level within a time interval;
wherein the duty cycle is determined after the determination that the received power is likely to exceed the maximum received power level within the time interval.

20. The method of claim 19, wherein:
the received optical signal data includes a plurality of measurements for received power; and
determining, by the one or more processors, that the received power is likely to exceed the maximum received power level within the time interval based on an identified trend of the plurality of measurements over the time interval.

21. The method of claim 19, wherein:
the received optical signal data includes a plurality of measurements for received power; and
determining, by the one or more processors, that the received power is likely to exceed the maximum received power level within the time interval based on an extrapolation of a trend of the plurality of measurements into the time interval.

* * * * *